UNITED STATES PATENT OFFICE 2,302,760

WOOD STAIN SOLVENT

Henry G. Goodman, Jr., Pittsburgh, Pa., assignor to Carbide and Carbon Chemicals Corporation, a corporation of New York No Drawing. Application June 1, 1940, Serial No. 338,378

11 Claims. (Cl. 8—6.5)

The invention concerns dye stains, especially solutions of dyes capable of considerable penetration of such substances as wood without causing appreciable raising of the surface fibers or grain, and it includes improved solvent vehicles for use in these staining compositions.

The use of polyhydroxy alcohols as solvents for water-soluble or alcohol-insoluble aniline dyes, or for the purpose of assisting in dissolving such dyes in the common organic solvents, in which the dyes are otherwise practically insoluble, has the disadvantage that the resulting dye solutions may be too hygroscopic for certain uses. For example, one of the difficulties attendant on the use of ethylene glycol or glycerol in non-grain-raising wood stains is the relatively large amount of the polyhydroxy alcohol required in order to secure a dye concentration which is sufficiently high for some desired uses and applications. The larger the amount of the hygroscopic material there is present in the wood stain, the greater the tendency for raising of the grain to occur, due to absorption or retention of moisture by the polyhydroxy alcohol remaining in the wood. In the case of veneer staining, the presence of the polyhydroxy alcohol in excessive amounts tends also to affect the glue holding the veneer.

The principal objects of the present invention are to overcome these disadvantages and to provide improved dye stain solutions, as well as improvements in the staining of wood and the like.

I have found that these objects can be achieved, and that solvents and vehicles yielding stains of bright, desirable properties can be obtained by incorporating in the organic liquid in which the dye stain is dissolved or dispersed a suitable amount of an addition substance which is a condensation product of primary or secondary amines with β-keto open chain acid amides of the structural formula:

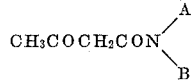

in which A is hydrogen or an aliphatic or aromatic radical and B is an aliphatic or aromatic radical.

By the use of the addition substance in dye stain solvent-vehicles in accordance with the present invention, the capacity of the solvent-vehicle for dispersing staining dyes of the water soluble, alcohol soluble or acid aniline type, and for retaining them in solution, is substantially improved without an accompanying undesirable increase in hygroscopicity. Also, by the use of such addition substances in dye stain solutions prepared according to the present invention, it is possible to reduce the amount of polyhydroxy alcohol otherwise required for a given concentration of the staining dye. Furthermore, the compositions of the present invention do not attack iron or aluminum, and may be stored in contact with either of these metals without resultant change in coloration or deterioration of the solvent-vehicle; or of the dye stain solution prepared therefrom. Preferably, polyhydroxy alcohol is used in an amount not to exceed about two to three times the weight of addition substance present in the solvent-vehicle or dye stain solution. In general, the addition substance may comprise from about one percent to about fifteen percent of the solvent-vehicle, and preferably from about two percent to about ten percent.

Besides the polyhydroxy alcohol and the addition substance, the solvent-vehicle or dye stain solution preferably contains a volatile common organic solvent such as, for example, a lower member of the alkanols, as illustrated by ethanol, isopropanol and, particularly, methanol. Exceptionally good results have been obtained using methanol in amounts ranging upwards from about four to about ten times the amount of addition substance present in the solvent-vehicle or dye stain solution.

The presence of still other substances in the solvent-vehicle or staining dye solution gives further improved results under certain conditions in the use of the dye stain solution prepared according to this invention. Thus, one or more of various aliphatic and aromatic hydrocarbons such as petroleum distillates, gasolene, solvent naphtha, benzene, toluene, ethyl benzene, xylene, and the like may be added to the solvent-vehicle with advantage. However, if the polyhydroxy alcohol present in the solvent-vehicle or dye stain solution is an alkylene glycol, it is preferred that toluene be present also in an amount about equal to the weight of the polyhydroxy alcohol; particularly if the alkylene glycol is ethylene glycol.

Thus it may be seen that the proportions of constituents in the solvent-vehicle and dye stain solution may be varied over a considerable range relative to the amount of addition substance present, and also relative to each other. Also, the dye stain solutions prepared according to the present invention are themselves well adapted for dilution by, or dispersion in, such solvents or diluents or mixtures of them as are commonly used in the staining art. It is not to be expected, however, that all solvents, diluents, or mixtures will yield identical results with all dye stains, prepared in accordance with the invention, but some will be more suitable than others.

The following example is given as illustrative of a solvent-vehicle prepared in accordance with the invention:

Example I

| | Parts by weight |
|---|---|
| Ethylene glycol | 5.7 |
| Toluene | 5.3 |
| Methanol | 87.0 |
| Addition substance | 2.0 |

I have found that addition substances useful in the solvent-vehicle of the above example may be produced by condensing a β-keto open chain acid amide with one of the following primary and secondary amines:

| | |
|---|---|
| Monooctylamine (mono-2-ethyl-hexylamine) | $CH_3(CH_2)_3CH(C_2H_5)CH_2NH_2$ |
| Monoethanolamine | $HOCH_2CH_2NH_2$ |
| Diethanolamine | $(HOCH_2CH_2)_2NH$ |
| Isopropanolamine | $CH_3CHOH-CH_2NH_2$ |
| Aniline | $C_6H_5NH_2$ |

Other products I have found suitable for use as an addition substance are the condensation products resulting from the condensation of a primary or secondary amine with one of the following:

| | |
|---|---|
| Acetoacetanilide | $CH_3COCH_2CONH(C_6H_5)$ |
| Acetoacetyl diethanolamine | $CH_3COCH_2CON(C_2H_4OH)_2$ |
| Diacetoacetyl ethylene diamine | $CH_3COCH_2CONHCH_2CH_2NHCOCH_2COCH_3$ |
| O-chloracetoacetanilide | $CH_3COCH_2CONHC_6H_4Cl$ |

Condensation products which are preferred as addition substances are as follows:

(a)
$$CH_3C=CHCONHC_6H_5$$
$$\underset{|}{HNCH_2CH(C_2H_5)CH_2CH_2CH_3}$$

Monooctyl (mono 2-ethyl hexyl) amine with acetoacetanilide.

(b)
$$CH_3C=CHCONHC_6H_5$$
$$\underset{|}{HN-C_2H_4OH}$$

Monoethanol amine with acetoacetanilide.

(c)
$$CH_3C=CHCONHC_6H_5$$
$$\underset{|}{N(C_2H_4OH)_2}$$

Diethanolamine with acetoacetanilide.

(d)
$$CH_3C=CHCONHC_6H_5$$
$$\underset{|}{HNCH_2CHOHCH_3}$$

Monoisopropanolamine with acetoacetanilide.

(e)
$$CH_3C=CHCONHC_6H_5$$
$$\underset{|}{HNC_6H_5}$$

Aniline with acetoacetanilide.

(f)
$$CH_3C=CHCONHC_2H_4NH-COCH=CCH_3$$
$$\underset{|}{H-NC_2H_4OH} \qquad \underset{|}{HNC_2H_4OH}$$

Monoethanolamine with diacetoacetyl ethylene diamine.

(g)
$$CH_3C=CHCON(C_2H_4OH)_2$$
$$\underset{|}{HNC_2H_4OH}$$

Monoethanolamine with acetoacetyl diethanolamine.

A method of preparation of the above condensation products is described in my copending application Serial No. 343,160, filed June 29, 1940.

The dye stain solvent-vehicle of this invention is capable of dissolving or retaining in dispersion substantial amounts of acid or water-soluble dyes as illustrated by the following:

| | |
|---|---|
| Amacid Brilliant Croecine 3BA Conc. (Color Index No. 252). | American Aniline Products Co. |
| Amacid Yellow M Conc. (Color Index No. 138). | American Aniline Products Co. |
| National Buffalo Black NBR (Color Index No. 246). | National Aniline and Chemical Co. |
| National Wool Orange A Conc. (Color Index No. 151). | National Aniline and Chemical Co. |
| National Croecine Scarlett MOO (Color Index No. 252). | National Aniline and Chemical Co. |
| Metanil Yellow Extra Conc. | General Dyestuffs Corporation. |

Storage tests indicate that no deterioration of the staining dye or dyestuff results when it is dispersed in a solvent-vehicle prepared according to the present invention, even though the dye solution stands over a long period of time, and even though the solution is in contact with iron or aluminum. For instance, the shades obtained after storage of the solution over a period of a few months were the same and as bright as those obtained from freshly prepared solutions.

A solvent-vehicle in which a condensation product of acetoacetanilide and monoethanolamine is employed as the addition substance of the present invention was prepared as follows:

Example II

| | Parts by weight |
|---|---|
| Ethylene glycol | 5.7 |
| Toluene | 5.3 |
| Methanol | 87.0 |
| Acetoacetanilide - monoethanolamine condensation product | 2.0 |

The solubility of representative wood stain dyes in the solvent-vehicle of Example II was found to be as follows:

Table A

| | Percent by weight |
|---|---|
| Amacid Brilliant Croecine 3BA Conc. | 3.6 |
| Amacid Yellow M Conc. | 14.8 |
| Wool Orange A Conc. | 2.8 |
| Buffalo Blue Black NBR | 3.7 |

Since mixed color tests are known to exaggerate greatly minute changes in the pure colors, storage tests on the solvent-vehicle of Example II were carried out by the mixed color method in accordance with the following procedure:

One gram of a water-soluble red aniline dye, such as is used in wood staining, was dissolved in 100 milliliters of the solvent-vehicle. The same amount of each of a yellow, black and an orange dye was also dissolved in 100 milliliter portions of the solvent-vehicle and mixtures of two solutions of opposite colors then made. Thus, for example, one part of the solution containing the red dye was mixed with four parts of the solution containing the yellow dye. A part of the stains prepared from the mixtures was used in staining Adirondack birch panels for comparison with a standard, and the remainder of the solutions were stored.

After a period of about a month had been permitted to elapse, the above stains were examined by comparing identical solutions made from freshly prepared solutions and from the aged solutions in the following manner:

One part of the aged red dye solution was mixed with four parts of freshly prepared yellow dye solution, and a similar mixture was also made from a fresh red dye solution and a fresh yellow dye solution. Adirondack birch panels were stained with these mixtures as before. A comparison of the panels established that no deterioration of the dyestuff had taken place in the wood stain solutions containing the several staining dyes dissolved in the solvent-vehicle. Thus, the addition substance was shown to exhibit no appreciable effect on the color of the dye solutions.

I have also found that polyalkylene glycols (polyalkylene oxides) may be used in dye stain solvents and solutions of the present invention. The effectiveness of the polyalkylene glycols was determined by comparison of stains made with solvents containing the monoglycols and the polyglycols respectively.

Other solvent-vehicles in which the polyhydroxy alcohol is a polyalkylene glycol (polyalkylene oxide) and in which a condensation product of acetoacetanilide and monoethanolamine is employed as the addition substance in accordance with the present invention were prepared as follows:

*Example III*

|  | Parts by weight |
|---|---|
| Polyethylene glycol (Aver. mol. weight approx. 400) | 5.7 |
| Toluene | 5.3 |
| Methanol | 87.0 |
| Acetoacetanilide-monoethanolamine condensation product | 2.0 |

*Example IV*

|  | Parts by weight |
|---|---|
| Polyethylene glycol (aver. mol. weight approx. 1500) | 5.7 |
| Toluene | 5.3 |
| Methanol | 87.0 |
| Acetoacetanilide-monoethanolamine condensation product | 2.0 |

*Example V*

|  | Parts by weight |
|---|---|
| Polyethylene glycol (aver. mol. weight approx. 4000) | 5.7 |
| Toluene | 5.3 |
| Methanol | 87.0 |
| Acetoacetanilide-monoethanolamine condensation product | 2.0 |

*Example VI*

|  | Parts by weight |
|---|---|
| Polypropylene glycol (viscosity of about 750 Saybolt seconds at 100° F.) | 5.7 |
| Toluene | 5.3 |
| Methanol | 87.0 |
| Acetoacetanilide-monoethanolamine condensation product | 2.0 |

Saturated solutions of a red dye and of a yellow dye were made up in each of the solvents of Examples III, IV, V, and VI. Mixed stains were then prepared from one part of the red stain with four parts of the yellow stain involving the same solvent-vehicle, and panels of birch stained with the mixture. A comparison of the resulting orange stains with each other and with a control failed to reveal any differences. No grain-raising was observed in any case.

After the above stain solutions were stored for a period of at least about five weeks, mixed color tests were made as before. All of the stains thus produced were identical in shade, showing that no deterioration resulted on storing or aging of the solutions.

The solvent-vehicle of this invention has the advantage that it may first be prepared in a more concentrated form with respect to the volatile common organic solvent, as illustrated by the following example:

*Example VII*

|  | Parts by weight |
|---|---|
| Alkylene glycol | 5.6 |
| Toluene | 5.2 |
| Methanol | 7.24 |
| Additional substance | 1.96 |

This solvent-vehicle concentrate remains in a homogeneous state without any observable separation or crystallization at temperatures as low as 0° C. Such a concentrated solvent-vehicle is well adapted for dispersion therein of staining dyes and the resulting dye solution is well adapted for the production of non-grain-raising stains which may be permanent, light-fast and non-bleeding into lacquer top coats, according to the particular dye used.

The solvent-vehicles of the examples are readily compatible with diluents such as benzene, or with hydrocarbons predominantly aliphatic in nature as are "Troluoil" or "Kemsolene T", for instance, or with mixtures of benzene and "Troluoil" or "Kemsolene T" in the ratio of about six parts of the solvent-vehicle to about one part of benzene and about one part of the aliphatic hydrocarbon, more or less.

It will be understood that various changes and modifications of the methods and specific details set forth may be made within the scope of this invention.

I claim:

1. A dye solvent-vehicle comprising a volatile common organic solvent, said solvent-vehicle being characterized by the presence therein of a polyhydroxy alcohol and an addition substance which is a condensation product of an organic amine in which the amino nitrogen atom has at least one hydrogen atom attached thereto with a β-keto open chain acid amide, the amino nitrogen atom of the amine being attached in said condensation product to said β-carbon atom of said acid amide.

2. A composition of matter adapted for the production of non-grain-raising wood stains upon dispersion therein of a staining dye, said composition comprising a volatile common organic solvent, a polyhydroxy alcohol, and an addition substance which is a condensation product of an organic amine in which the amino nitrogen atom has at least one hydrogen atom attached thereto with an amide of acetoacetic acid, the amino nitrogen atom of the amine being attached in said condensation product to the β-carbon atom of the acetoacetyl radical of said amide.

3. A composition of matter adapted for the production of non-grain-raising wood stains upon dispersion therein of a staining dye of the water-soluble, light-fast acid type, said composition comprising a volatile common organic solvent, an alkylene glycol and an addition substance which is a condensation product of an organic amine in which the amino nitrogen atom has at least one hydrogen atom attached thereto with an amide of acetoacetic acid, the amino nitrogen atom of the amine being attached in said condensation product to the β-carbon atom of the acetoacetyl radical of said amide.

4. A composition of matter adapted for the production of non-grain-raising wood stains upon dispersion therein of a water-soluble, light-fast aniline dye, said composition comprising a common volatile organic solvent including a lower aliphatic alcohol; ethylene glycol and a member of the benzene series of hydrocarbons in about equal amounts; a lesser amount of a condensation product of an alkylolamine in which the amino nitrogen atom has at least one hydrogen atom attached thereto with an amide of acetoacetic acid and an organic amine, the amino nitrogen atom of the alkylolamine being attached in said condensation product to the β-carbon atom of the acetoacetyl radical of said amide; said lower aliphatic alcohol being present in an amount at least sufficient to maintain said composition in a substantially homogeneous solution.

5. A solvent-vehicle concentrate adapted for the production of dye stains upon dispersion therein of a light-fast dye of the type which is normally insoluble in volatile hydrocarbon, said concentrate having substantially the following composition in parts by weight:

| | Parts |
|---|---|
| Ethylene glycol | 6 |
| Toluene | 5 |
| Methanol | 61.6 to 84 |
| Acetoacetanilide-monoethanolamine condensation product of the formula: | |

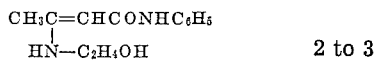

2 to 3

6. A solvent-vehicle concentrate adapted for the production of dye stains upon dispersion therein of a light-fast dye of the type which is normally insoluble in volatile hydrocarbon, said concentrate having substantially the following composition in parts by weight:

| | Parts |
|---|---|
| Ethylene glycol | 6 |
| Toluene | 5 |
| Methanol | 61.6 to 84 |
| Acetoacetanilide-diethanolamine condensation product of the formula: | |

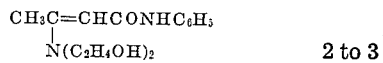

2 to 3

7. A solvent-vehicle concentrate adapted for the production of dye stains upon dispersion therein of a light-fast dye of the type which is normally insoluble in volatile hydrocarbon, said concentrate having substantially the following composition in parts by weight:

| | Parts |
|---|---|
| Ethylene glycol | 6 |
| Toluene | 5 |
| Methanol | 61.6 to 84 |
| Acetoacetanilide-isopropanolamine condensation product of the structure: | |

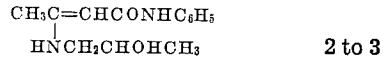

2 to 3

8. A wood stain composition comprising a staining dye dispersed in a solvent-vehicle therefor including a polyhydroxy alcohol and an addition substance which is a condensation product of an organic amine in which the amino nitrogen atom has at least one hydrogen atom attached thereto with an amide of a β-keto lower monocarboxylic acid, the amino nitrogen atom of the amine being attached in said condensation product to the β-carbon atom of the acyl radical of said amide.

9. A wood stain composition containing a light-fast dye of the type which is normally insoluble in volatile hydrocarbons dispersed in a solvent-vehicle for such dye, said solvent-vehicle comprising a volatile common organic solvent including a lower aliphatic alcohol; an alkylene glycol; and an addition substance which is a condensation product of an organic amine in which the amino nitrogen atom has at least one hydrogen atom attached thereto with an amide of acetoacetic acid, the amino nitrogen atom of said organic amine being attached in said condensation product of the β-carbon atom of the acetoacetyl radical of said amide.

10. A wood stain composition comprising a staining dye dispersed in a solvent-vehicle therefor including the following substances in parts by weight approximately as follows:

| | Parts |
|---|---|
| Ethylene glycol | 6 |
| Toluene | 5 |
| Methanol | at least 84 |
| Addition substance | 2 to 3 | said addition substance being a condensation product of an alkylolamine in which the amino nitrogen atom has at least one hydrogen atom attached thereto with an amide of acetoacetic acid and an aromatic amine, the amino nitrogen atom of the alkylolamine being attached in said condensation product to the β-carbon atom of the acetoacetyl radical of said amide.

11. A composition of matter adapted for the production of non-grain-raising wood stains upon dispersion therein of a staining dye of the water-soluble, light-fast acid type, said composition comprising a volatile common organic solvent, a polyalkylene glycol having an average molecular weight of at least 400, and an addition substance which is a condensation product of an organic amine in which the amino nitrogen has at least one hydrogen atom attached thereto with a β-keto open chain acid amide, the amino nitrogen atom of the amine being attached in said condensation product to said β-carbon atom of said acid amide.

HENRY G. GOODMAN, Jr.